C. S. BANGHART.
FENDER FOR RAILWAY CARS.
APPLICATION FILED JUNE 4, 1913.
1,136,641.
Patented Apr. 20, 1915.
2 SHEETS—SHEET 1.
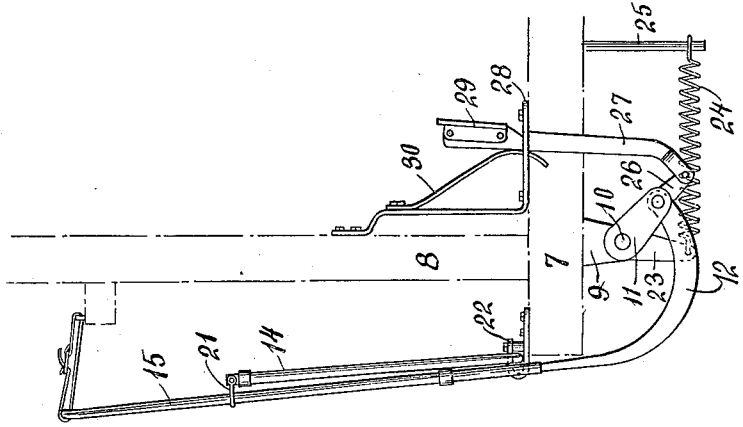
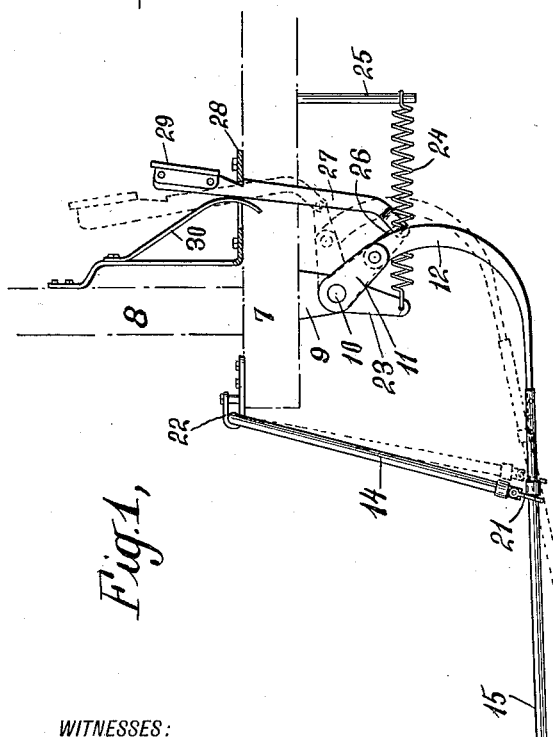
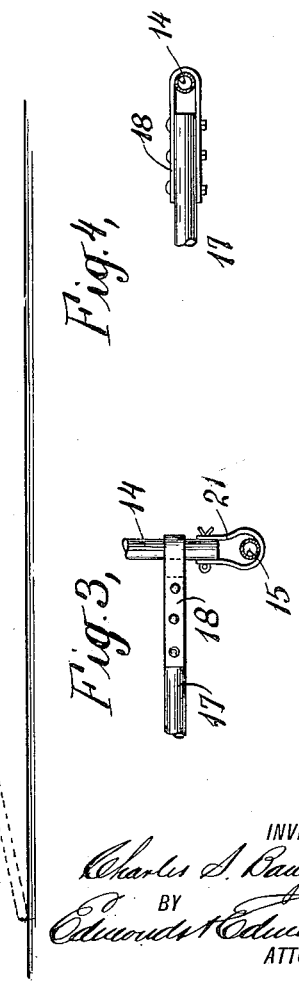
WITNESSES:
INVENTOR
Charles S. Banghart
BY
Edmonds & Edmonds
ATTORNEY

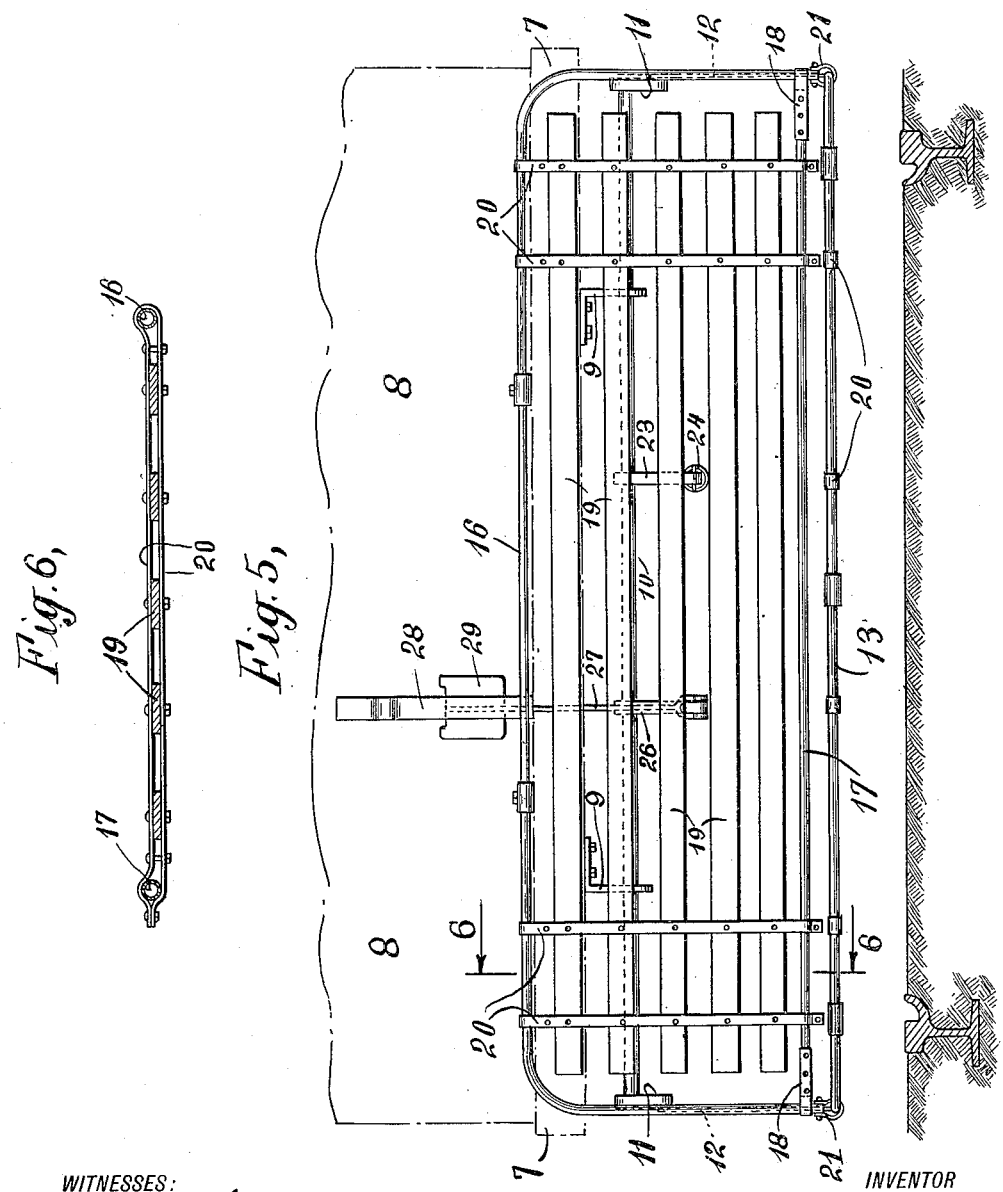

UNITED STATES PATENT OFFICE.

CHARLES S. BANGHART, OF FLUSHING, NEW YORK, ASSIGNOR, BY MESNE ASSIGNMENTS, TO N-W EQUIPMENT CO., INC., OF NEW YORK, N. Y., A CORPORATION OF NEW YORK.

FENDER FOR RAILWAY-CARS.

1,136,641.   Specification of Letters Patent.   Patented Apr. 20, 1915.

Application filed June 4, 1913. Serial No. 771,652.

*To all whom it may concern:*

Be it known that I, CHARLES S. BANGHART, a citizen of the United States, residing at Flushing, in the county of Queens and State of New York, have invented certain new and useful Improvements in Fenders for Railway-Cars, of which the following is a specification.

This invention relates to fenders adapted to be mounted upon the platform of a railway car projecting forwardly from the car.

The invention is directed to the provision of a fender of an improved form and particularly one which is so constructed that its forward edge may be quickly depressed by the motorman on the platform of the car when occasion arises for the forward edge of the fender to be so depressed.

A further object of the invention is to so construct the fender that the forward edge thereof may be raised to restore the fender to its normal operative position after being depressed, this restoration of the fender being effected from the platform of the car by the motorman.

A further object of the invention is to so construct and arrange the parts of the fender, that while the fender is capable of being depressed as above set forth and may be restored in the manner indicated, it may also be turned upwardly to an inoperative position in which the fender is disposed vertically against the dash of the car.

Most of the fenders now in use on railway cars are so constructed that when in operative position their forward edges are a substantial distance above the roadway in front of the car, so great a distance in fact that in many cases of accident the fender would be useless and might even result in making the accident more serious. Conditions of operating railway cars make it impractical to mount a fender on a car with its forward edge as low as is desired to make the fender most effective.

In accordance with the present invention, springs are provided acting upon the fender in a direction to depress the forward edge of the fender and the springs are restrained from operating by a latch. The operative member of this latch projects above the platform of the car immediately in front of the motorman's position upon the platform so that the motorman can readily give this latch a blow with his foot to cause the release of the fender. When the fender is so released, its forward edge drops to, or very close to, the roadway so that the fender will be most effective in preventing a serious accident. The fender may be restored to its normal operative position from the platform by merely depressing a pedal thereon, this pedal being preferably the operating member of the latch.

The preferred embodiment of the invention is illustrated in the accompanying drawings in which—

Figure 1 is an end view of the fender, Fig. 2 is a similar view showing the fender raised to an inoperative position, Figs. 3 and 4 are detail views hereinafter referred to, Fig. 5 is a front view of the fender and Fig. 6 is a vertical section on the line 6—6 of Fig. 5.

Referring to these drawings, 7 indicates the platform of the car and 8 the dash thereof. Standards 9 depend from the under side of platform 7 and support a rock-shaft 10. On this shaft are two cranks 11 to the ends of which are pivotally connected the rear ends of the side members 12 of the horizontal portion of the fender. The horizontal portion 13 and the vertical portion 14 of the fender may be of the usual or any suitable construction. As here shown the horizontal member 13 has the front edge and the side edges thereof formed from a pipe 15 which is bent to the proper shape, its ends being connected to the arms 12 which are pivoted to the cranks 11. The vertical portion 14 of the fender has its upper edge and its side edges formed from a pipe 16. The ends of this pipe 16 are connected by a pipe 17 to the ends of which straps 18 are secured, these straps encircling the pipe 16 as shown in Figs. 3 and 4. Between the pipes 16 and 17 are a plurality of slats 19, these being held in position by straps 20 secured to the slats 19 and extending around pipes 16 and 17 as shown in Fig. 6. The ends of the pipe 16 have straps 21 secured thereto as shown in detail in Fig. 3, these straps extending around the pipe 15 of the horizontal portion of the fender.

The vertical portion 14 of the fender is suspended from the platform 7 of the car. As shown in Fig. 1, straps 22 are provided upon the platform 7 encircling the portion of pipe 16 which constitutes the upper edge of portion 14. The eyelets or straps 21 encircle the frame of the horizontal portion of the fender so loosely that they will slide readily thereon and of course pipe 16 will turn easily in the eyelets or straps 22. The fender may therefore be readily turned to an inoperative position in which it is vertically disposed, as shown in Fig. 2. When so turned, the horizontal portion of the fender turns about the axis of the connection of the arms 12 to the cranks 11, the eyelets 21 slide along the pipe 15 and the pipe 16 turns in the eyelets 22.

The rock-shaft 10 has one or more cranks 23 thereon to each of which one end of a spring 24 is connected, the other end of the spring being secured to a suitable support 25 on the platform of the car. The rock-shaft also has a crank 26 secured thereto to the end of which is pivotally connected the lower end of the member 27 which constitutes the latch and the restoring device. This member 27 extends upwardly through an opening in a metallic plate 28 mounted on the upper surface of the platform 7 and at its upper end it carries a vertically disposed plate 29. Also the member 27 has a notch cut therein, the lower wall of which is horizontally disposed while the upper wall is inclined. A spring 30 is mounted on the dash of the car and presses against the member 27 in a direction to carry the notched edge of the member into coaction with the plate 28.

The fender 13 thus constructed and arranged is supported primarily at a point intermediate its forward and rear edges. The portion 14 of the fender constitutes this support by means of which the fender 13 is suspended from the dash of the car at a point intermediate its front and rear edges. The rear edge of the fender 13 is pivotally connected and means are provided for shifting the pivotal connection of the rear edge of the fender 13 so as to shift the front edge of the fender and thus regulate the inclination of the fender.

With the parts in the positions in which they are shown by the full lines in Fig. 1, if the motorman finds that he is unable to stop his car in time to avoid hitting a person in the roadway in front of the car, he kicks the plate 29 on the lever 27 thus disengaging the latch 27 from the plate 28 and releasing the springs 24. These springs act through the cranks 23 to rock shaft 10 and this rocking movement of the shaft causes the cranks 11 to raise the rear ends of the arms 12. When the arms 12 are so raised, the fender 13 turns about its connection to the vertical member 14 as a pivot so that the forward edge of the fender 13 is depressed until it bears upon or is close to the roadway. Preferably the forward edge of the fender 13 is provided with rollers or buffers which engage the roadway when the fender is so depressed. By employing springs 24 of ample power the movement of the fender as above described is effected practically instantaneously, and when the fender is in its depressed position there is no danger of a person who is knocked over in the roadway passing under the fender or being caught upon the forward edge of the fender. When the fender has been depressed, as above described, the member 27 is raised to the position shown in dotted lines in Fig. 1. To restore the fender to its operative or normal position, it is only necessary for the motorman to press down upon the top of plate 29 and member 27, thus acting through crank 26 to rock shaft 10 in its bearings against the tension of springs 24. When the parts have been restored in this manner to the normal position, the notch in member 27 engages plate 28 to hold the parts against movement effected by springs 24. When so restoring the parts, the pivotal connection to the arms 12 is carried downwardly and this correspondingly raises the forward edge of the fender. It will thus be seen that mechanism is provided for instantaneously depressing the forward edge of a fender projecting forward from the front of the car, this mechanism being controlled by the motorman upon the platform of the car. The mechanism is spring-operated and the only thing required of the motorman is to effect the release of the springs. The movement of the fender is effected by shifting the pivotal connection to the rear edge of the fender so as to move the fender about the pivotal connection thereto at a point between its forward and rear edges. It will furthermore be seen that the manner of mounting the fender on the car is such that while the fender has the capacity for being moved as above described in cases of emergency, it may also be moved to inoperative position in which it is disposed vertically against the dash of the car.

Having described my invention, what I claim as new therein and desire to secure by Letters Patent of the United States is:

1. The combination of a shaft adapted to be supported from a car, a fender having a horizontal portion, a supporting apron extending downwardly from the car to the fender at a point intermediate the forward and rear edges of the fender, and there pivotally supporting the fender, a crank pivotally connecting the shaft and the rear portion of the fender, a second crank on said shaft, a vertically movable trip lever extending above the car floor and pivotally connected to said second crank, latch means coacting with said trip lever, for holding the fender in normal position, the fender being adapted to be turned about its pivotal connection with said first crank into an inoperative vertical position, and said trip lever being operable to permit the rocking of the fender about its pivotal connection with the apron, to lower the forward edge of the fender from normal position, and to raise it to normal position, substantially as set forth.

2. The combination of a fender mounted on a car and supported intermediate its forward and rear edges, a spring tending to raise the rear edge of the fender and thereby depress the forward edge, a foot lever operable from the car platform and pivotally connected to the rear end of the fender, a latch plate coacting with said lever, for holding the fender in normal position and preventing said lever from rising, and spring means for holding said lever in latched position, said lever being operable from the car platform to unlatch the same, to permit said first-named spring to raise the rear edge of the fender, and said lever, and depressible into latched position, to restore said fender to normal position, substantially as set forth.

3. The combination of a car having a motorman's platform, a fender mounted on the car and supported intermediate its forward and rear edges, a crank pivoted to the car and to the rear portion of the fender about which the fender may be turned to move the fender to an inoperative vertical position, and means for rocking said crank about its pivot on the car to rock said fender about its support to depress and raise the forward portion of the fender, substantially as set forth.

4. The combination of a car having a motorman's platform, a fender mounted on the car and supported intermediate its forward and rear edges, a pivotal connection to the rear portion of the fender about which the fender may be turned to move the fender to an inoperative vertical position, a spring for shifting said pivotal connection to raise the rear portion of the fender, a latch to hold the parts against the tension of said spring, means for releasing the latch, and means for restoring the fender to normal position when it has been operated by the spring, substantially as set forth.

5. The combination of a car platform, a fender, a connection from the platform to the fender at a point intermediate the forward and rear edges of the fender, a shaft mounted on the platform, cranks on the shaft connected to the rear portion of the fender, a spring connected to a crank on said shaft tending to raise the rear edge of the fender and depress the front edge, a latch for holding said shaft against movement actuated by said spring, and means for turning the shaft against the tension of said spring to raise the forward edge of the fender, substantially as set forth.

6. The combination of pedestals adapted to be secured to a car, a shaft supported thereby, cranks thereon, a fender, means for supporting the fender intermediate its forward and rear edges from the car, pivotal means connecting one of said cranks to the rear edge of said fender, means connected to another of said cranks tending to raise the rear edge of said fender, and a latch device, releasable from the car, for holding the rear edge of said fender in raised position, substantially as set forth.

7. The combination of a shaft adapted to be supported from a car, a fender, means for supporting the fender, intermediate its forward and rear edges, from the car, a pivotal connection between said shaft and the rear edge of said fender, means acting on said shaft resiliently to raise the rear edge of said fender, a member operable from said car, operatively connected to said shaft, and means for latching said member in one position in which the rear edge of the fender is in lowered position, said member being operable in one direction to release said latching means and in the same direction to again latch the same, substantially as set forth.

This specification signed and witnessed this fifth day of May, 1913.

CHARLES S. BANGHART.

Witnesses:
ROBERT E. FULTON,
A. J. STRATTON.